United States Patent [19]

St. John

[11] 4,226,320
[45] Oct. 7, 1980

[54] CENTRIFUGAL CLUTCH CONSTRUCTION

[75] Inventor: Richard C. St. John, North Canton, Ohio

[73] Assignee: Aspro, Inc., Canton, Ohio

[21] Appl. No.: 907,925

[22] Filed: May 22, 1978

[51] Int. Cl.² ............................................. F16D 43/14
[52] U.S. Cl. ......................... 192/105 CD; 192/105 CE
[58] Field of Search ................. 192/105 CD, 105 CE, 192/105 BA, 103 B; 188/184

[56] References Cited

U.S. PATENT DOCUMENTS

| | | | |
|---|---|---|---|
| 1,611,847 | 12/1926 | Anderson | 192/105 CD |
| 2,087,968 | 7/1937 | Dodge | 192/105 CD |
| 2,375,909 | 5/1945 | Fawick | 192/105 CD |
| 2,626,034 | 1/1953 | Fawick | 192/105 CD |
| 2,782,893 | 2/1957 | Chapman | 192/105 CE |
| 3,197,004 | 7/1965 | Salsbury | 192/105 CD |
| 3,367,463 | 2/1968 | Armstrong | 192/105 CD |
| 3,512,373 | 5/1970 | White | 192/105 CD |
| 4,016,964 | 4/1977 | Dietzsch | 192/105 CD |

FOREIGN PATENT DOCUMENTS

| | | | |
|---|---|---|---|
| 940562 | 10/1963 | United Kingdom | 192/105 CD |
| 962975 | 7/1974 | United Kingdom | 192/105 CD |

*Primary Examiner*—George H. Krizmanich
*Attorney, Agent, or Firm*—Frease & Bishop

[57] ABSTRACT

A centrifugal clutch having a drive flange mounted on a hub which is adapted to be mounted on a driving shaft. A pair of clutch shoes is pivotally mounted at diagonally opposite ends of the shoes on the drive flange by a pair of pins which extend axially outwardly from the drive flange in a cantilever manner, with the clutch shoes being mounted in end-to-end relationship with respect to each other. Extension springs bias the swinging ends of the clutch shoes toward retracted position. The clutch shoes are adapted to move outwardly under the influence of centrifugal force and overcome the biasing effect of the springs to drivingly engage a concentrically mounted clutch housing. A plurality of weight plates may be mounted on the webs of the clutch shoes to provide various operating characteristics without changing the basic clutch construction. The cantilever pins are operatively connected to the clutch shoes by a bushing assembly having inner and outer rigid tubular sleeves with an intervening annulus of an elastomer material. The elastomer material flexes to provide the pivotal or swinging movement of the clutch shoes while simultaneously providing a shock-absorbing effect between the clutch shoes and the drive flange when the shoes engage the clutch housing. Alternately, a bushing of a high-strength plastic material may be telescopically mounted on each of the cantilever pins with the clutch shoes being slidably mounted on these bushings.

5 Claims, 15 Drawing Figures

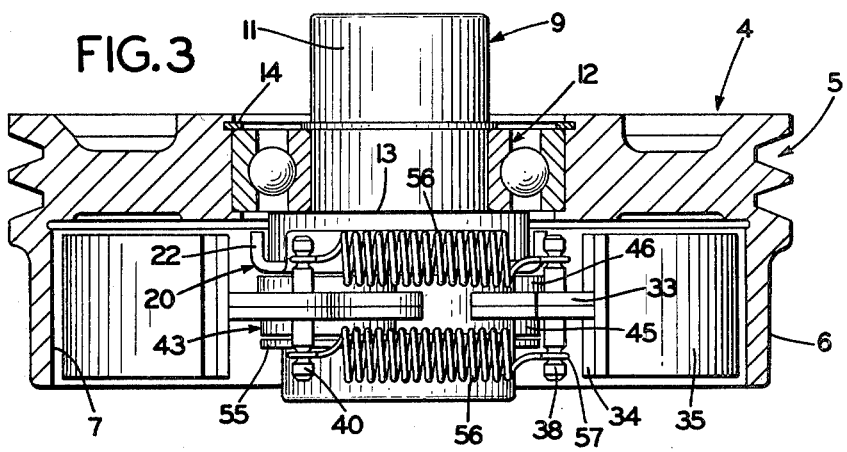
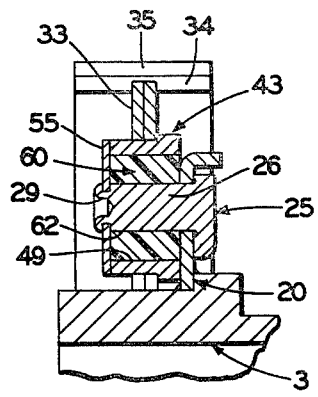
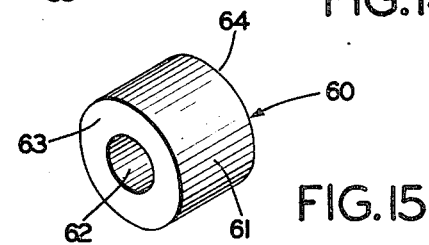
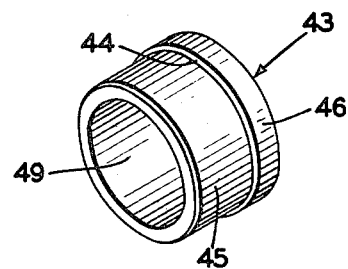
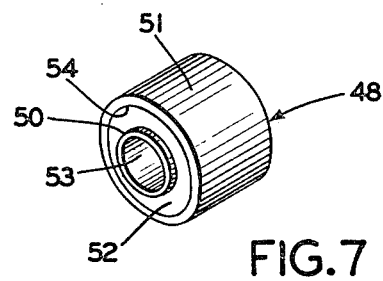
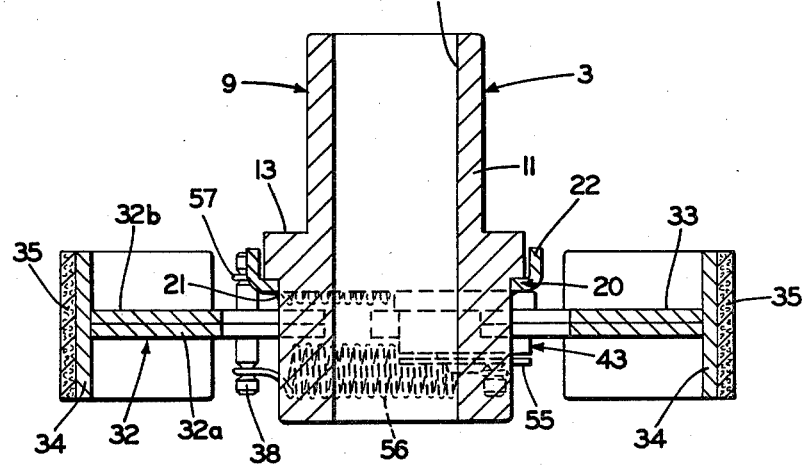
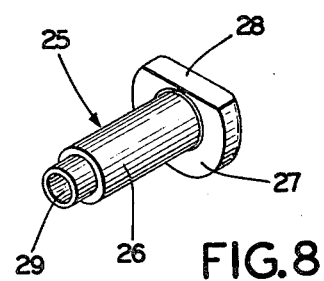

CENTRIFUGAL CLUTCH CONSTRUCTION

BACKGROUND OF THE INVENTION

1. Field of the Invention

The invention relates to clutches, and more particularly, to clutches which are operated automatically by centrifugal force at a predetermined speed of rotation so as to connect a driving member to a driven member or load. More particularly, the invention relates to an improved centrifugal clutch construction of the type having a pair of pivotally mounted clutch shoes which swing outwardly into coupling engagement with a driven clutch member.

2. Description of the Prior Art

There are numerous types and arrangements of centrifugal clutch constructions in which one or more clutch shoes are retained in retracted position by springs until sufficient centrifugal force acts on the shoes to overcome the force of retaining springs, whereupon the clutch shoes pivot and swing outwardly and engage a stationary clutch housing or drum.

Many of these clutch constructions have a pair of arcuate-shaped clutch shoes which are pivotally mounted on a clutch backing plate and arranged in an end-to-end relationship with respect to each other. The backing plate in turn is fixed to a drive shaft or hub for rotation with the drive shaft. These clutch shoes have various spring arrangements for biasing the shoes toward retracted position, which spring retaining tensions must be overcome by the centrifugal force before the clutch shoes engage the driven member.

Many of these types of centrifugal clutches have proven satisfactory for their intended use. Most of these known clutch constructions use a simple beam-type pivotal mounting arrangement for the clutch shoes, that is, the pivot pin is supported on both ends by a pair of backing plates or other fixed components, with the clutch shoe pivotal connection being formed between these spaced supports on the pivot pin. These simple beam-type clutch mounting constructions result in a clutch having a relatively wide configuration in an axial direction due to the clutch shoe pivot pin supports being on both sides of the pin to provide the necessary strength and rigidity thereto. This excessive width limits or prevents the clutch from being used in certain installations where space is critical.

These simple beam-type pivot pin mounting arrangements generally include a pivot pin or its equivalent which projects through an opening formed adjacent one end of each of the clutch shoes to form the pivotal connection for the shoe. Metal bearing sleeves have been provided in some of the structures to assist in the pivotal movement of the clutch shoes on the pins. These metal-to-metal pivot pin mounting arrangements transmit the coupling shock and other forces which are exerted on the clutch shoes when engaging the driven drum, directly to the pivot pin and associated pin mounting plates or components. This force transmittal, in addition to causing fatigue in the connecting components, results in a relatively rough coupling with the driven member.

Another problem or disadvantage of these prior type clutch constructions is that a somewhat different clutch must be designed and built for each particular operating condition so that the clutch shoes will engage or disengage the driven member upon the drive shaft reaching a predetermined speed. These engagement and disengagement speeds may vary due to changes in the retaining spring characteristics which can be affected by ambient temperature, age, wear, etc. It is desirable to be able to maintain the same engagement and disengagement speeds as the age of the clutch increases without replacing the biasing springs. Likewise, in many applications it is desirable to change more radically the engagement and disengagement speeds to achieve different clutch operating characteristics. The engagement and disengagement speeds, among other factors, are dependent upon the weight of the clutch shoes. Some known clutch constructions have provided means for replacing the clutch shoes with different shoes of varying weights to achieve different clutch operating characteristics. This arrangement involves considerable time and expense required to replace both clutch shoes. Another clutch construction provides a shoe having a tube for receiving varying amounts of B-B's or lead shot for changing the shoe weight, such as shown in U.S. Pat. No. 3,687,254.

U.S. Pat. No. 2,087,968 discloses a centrifugal clutch construction in which the clutch shoes are slidably, pivotally mounted on a type of cantilever anchor pin which engages a U-shaped slot formed in the end of the shoe. A second pin which is fixed to the backing plate and extends through a slotted opening in the other end of the shoe is required to provide the desired self-energizing action. This slotted end mounting arrangement may present undesirable operating characteristics in certain installations due to the repeated outward and rearward movement of the clutch shoe slotted end from the anchor pin. An undesirable shock or force is exerted on the slotted shoe end each time it strikes the anchor pin upon its return. The shoe end should be fixed with respect to its anchor post or pivot pin to prevent these undesirable forces from repeatedly being exerted on the pivot pin. U.S. Pat. No. 2,087,968 also discloses the use of weighted washers mounted on the shoes at the swinging ends of the shoes, in order to change the shoe operating characteristics. The mounting of the weights at the ends of the shoes could shift the center of gravity off-center of the shoe which could effect the operation thereof.

There is no known centrifugal clutch construction of which I am aware which provides for pivotally mounting the clutch shoes on cantilever-type pins to eliminate the heretofore space occupying, simple beam-type pivot pin mounting arrangement in which pivot pin bushing assemblies absorb much of the stresses and shocks exerted on the clutch shoes; and which provides an extremely simple and inexpensive means of changing the weight of the clutch shoes to achieve different clutch operating characteristics without unbalancing the weight distribution of the shoes.

SUMMARY OF THE INVENTION

Objectives of the invention include providing an improved centrifugal clutch construction having a pair of clutch shoes arranged in an end-to-end relationship with respect to each other and pivotally mounted on a clutch backing plate or drive flange by a pair of cantilever pins which eliminates the heretofore additional components required for supporting the extended ends of the pins as in prior clutch constructions; providing such a clutch construction having a bushing assembly mounted on each of the cantilever pins and operatively engageable with the clutch shoes, which bushing assembly contains an annulus of an elastomer material that flexes to provide the pivotal swinging movement for the clutch shoes when moving between retracted and extended positions and which absorbs much of the coupling engagement forces and stresses exerted on the clutch shoes thereby eliminating the transmittal of these forces and stresses to the remainder of the clutch components; providing such a clutch construction in which the cantilever pin bushing assembly may be a cylindrical-shaped bushing formed of a high strength plastic which is able to withstand the repeated forces and stresses exerted thereon and in addition is able to provide a relatively smooth broad sliding surface for pivotal movement of the clutch shoe when moving between engaged and retracted positions; providing such a clutch construction in which one or more weight plates may be removably mounted on the center of existing clutch shoes easily and conveniently to change the effective weight of the shoes to obtain different operating characteristics without unbalancing the clutch shoe, and in which the weight plates are mounted on the shoe webs within the confines of the clutch shoes to avoid undesirable components from projecting outwardly from the clutch; and providing a centrifugal clutch construction which is of a relatively simple arrangement, easy to manufacture and assemble, sturdy and durable in use and which eliminates difficulties heretofore encountered with other known clutch constructions, which achieves the objectives indicated and which solves problems and satisfies needs existing in the art.

These objectives and advantages are obtained by the centrifugal clutch construction, the general nature of which may be stated as including a driven clutch member; drive shaft means; drive flange means mounted in a fixed position on the drive shaft means for rotation with said shaft means; a pair of pin means mounted on the drive flange means and extending in an axial direction from the flange means in a cantilever manner; a pair of arcuate-shaped clutch shoes each having first and second ends pivotally mounted on the drive flange means in end-to-end relationship with respect to each other and movable outwardly towards and against the driven clutch member under the influence of centrifugal force from retracted to extended position; the clutch shoes each having a frictional coupling surface adapted to drivingly engage the driven clutch member when the clutch shoes are in extended position; spring means operatively engageable with the second ends of the clutch shoes biasing said clutch shoes toward retracted position; a pair of bushing means pivotally mounting the clutch shoes on the pin means, each of said bushing means including telescopically mounted inner and outer tubular members, said outer tubular member being securely mounted on a respective clutch shoe first end with said inner member being telescopically mounted on the pin means, and the clutch shoe pivotal movement occurring between said inner and outer tubular members; and weight means adapted to be removably mounted on the clutch shoes for changing the mass of said shoes without appreciably affecting the shoe's center of gravity.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 3 is a top plan view of the clutch construction of FIG. 1 with the clutch housing and bearing shown in section;

FIG. 4 is a sectional view taken on line 4—4, FIG. 1 of the rotor assembly;

FIG. 5 is a sectional view taken on line 5—5, FIG. 1 of the rotor assembly;

FIG. 6 is an enlarged perspective view of the bushing assembly sleeve of the clutch shoe cantilever pin mounting means;

FIG. 7 is an enlarged perspective view of the bushing which is mounted within the sleeve of FIG. 6;

FIG. 8 is an enlarged perspective view of the clutch shoe cantilever mounting pin;

FIG. 14 is a fragmentary sectional view similar to the upper portion of the clutch rotor assembly shown in FIG. 4, showing the clutch shoe being mounted on the cantilever pin by a plastic bushing; and FIG. 15 is an enlarged perspective view of the plastic bushing of FIG. 14.

Similar numerals refer to similar parts throughout the drawings.

DESCRIPTION OF THE PREFERRED EMBODIMENT

Figure 1:
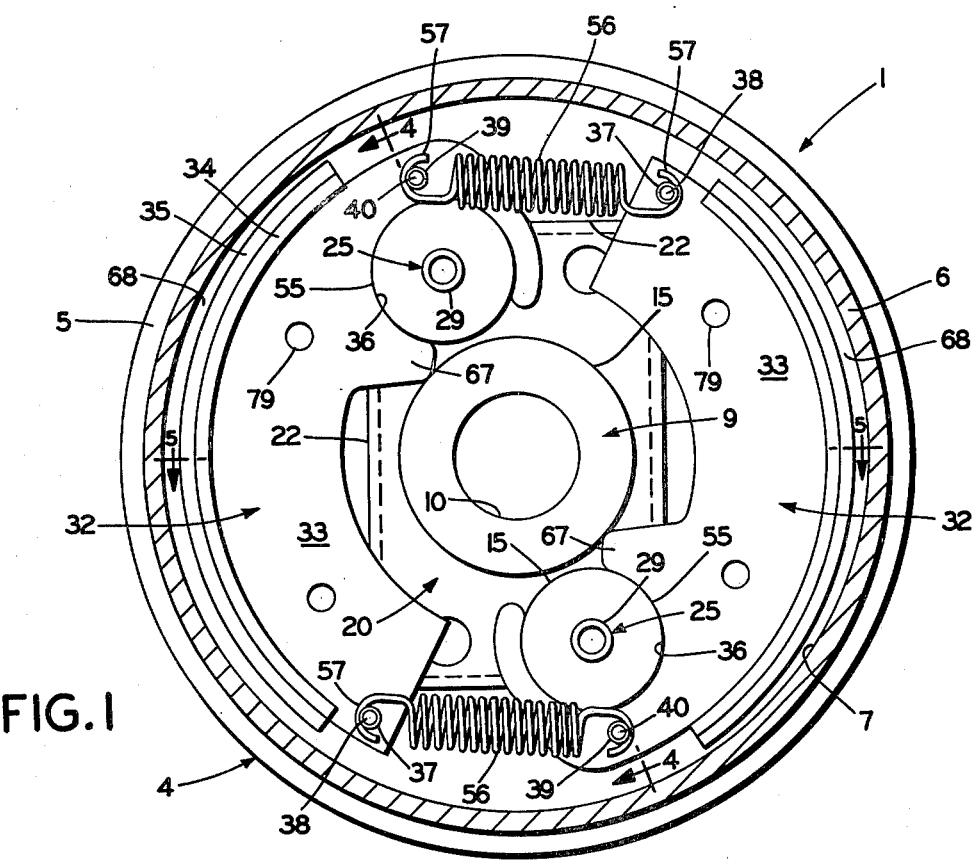
FIG. 1 is a front elevational view of the improved centrifugal clutch construction shown in retracted position, mounted within a clutch housing shown in section.
Figure 2:
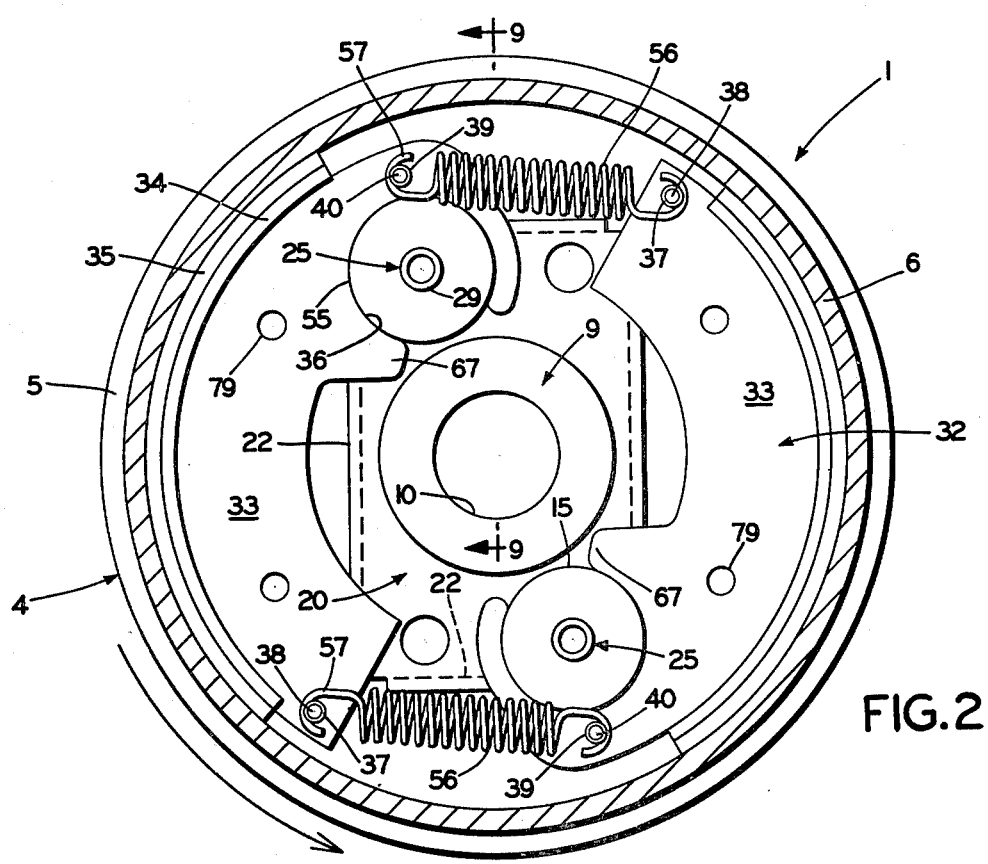
FIG. 2 is a front elevational view similar to FIG. 1 with the improved clutch construction shown in engaged position with the clutch housing.
Figure 10:
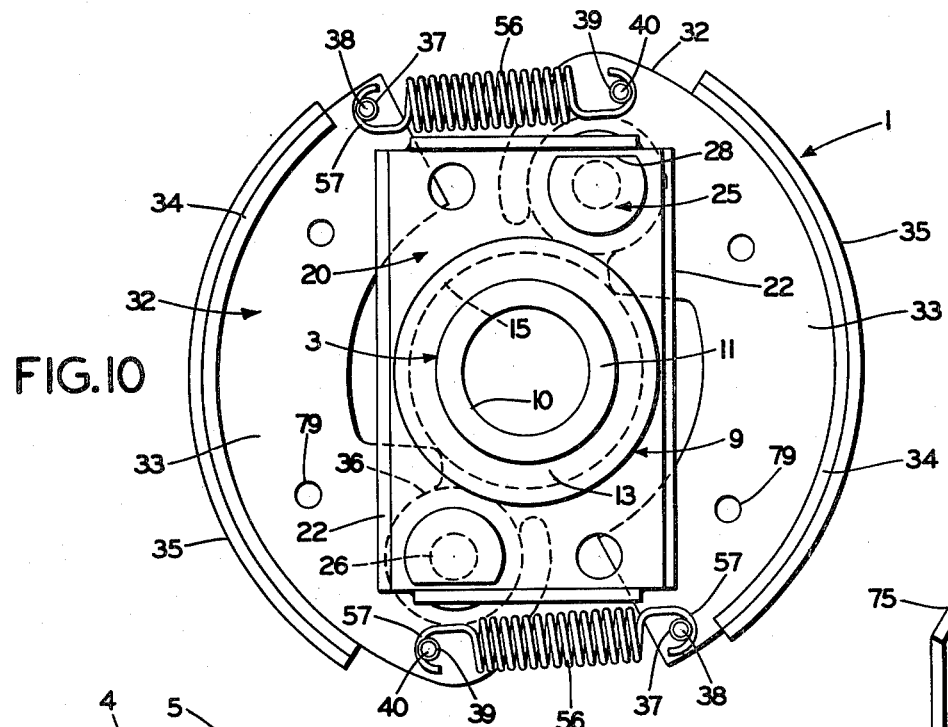
FIG. 10 is a rear elevational view of the improved clutch construction of FIG. 1 with the clutch housing removed.
Figure 9:
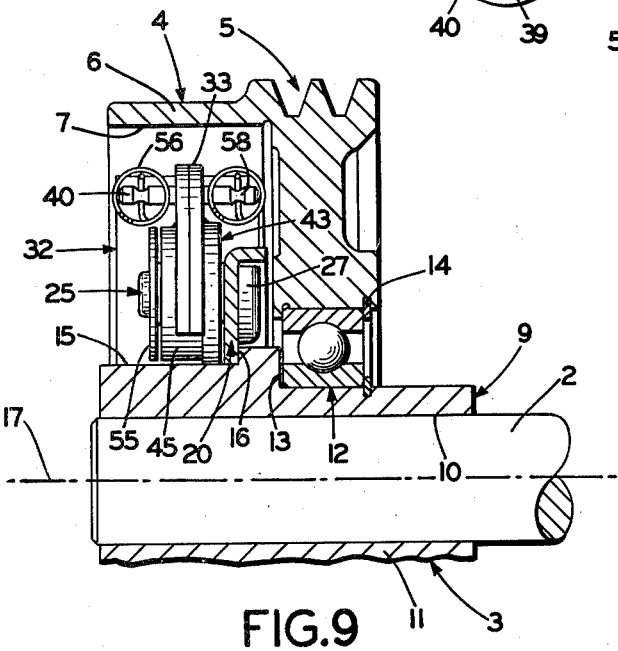
FIG. 9 is a fragmentary sectional view taken on line 9—9, FIG. 2.

The improved clutch construction is indicated generally at 1, and is shown particularly in FIGS. 1 and 2, and is intended to be driven by a power drive shaft 2 (FIG. 9). Clutch 1 includes a rotor assembly 3 (FIGS. 4 and 5), and a driven clutch member or housing 4, shown particularly in FIG. 3. Clutch 1 is shown in disengaged position in FIG. 1 and in engaged position with housing 4 in FIG. 2.

Housing 4 is shown as an integral pulley clutch housing having a multi-V-grooved pulley end-formation 5 which is connected to a cylindrical housing drum wall 6 (FIG. 3). The inner surface 7 of drum wall 6 provides the coupling surface for drivingly connecting clutch housing 4 with rotor assembly 3. Housing 4 may have various configurations and arrangements and may be adapted to be operatively engaged with mechanisms other than a multi-V-grooved pulley belt without departing from the concept of the present invention.

Rotor assembly 3 includes a hub 9 which is adapted to be mounted on and secured to shaft 2 by a key-keyway arrangement (not shown) or other attachment means so as to rotate with drive shaft 2. Hub 9 has a smooth cylindrical bore 10 in which shaft 2 is located. Hub 9 further includes a reduced end 11 which is provided with a cylindrical outer surface on which driven clutch housing 4 is rotatably mounted by a bearing ring 12 (FIGS. 3 and 9). Bearing ring 12 is located between an annular shoulder 13 formed on hub 9 and a snap ring 14 which maintains bearing ring 12 in position against shoulder 13.

The other end 15 of hub 9 is provided with a cylindrical surface (FIGS. 4 and 9) having a larger diameter than that of end 11. End 15 also terminates in an annular shoulder 16 which extends radially with respect to the central axis or center line 17 of rotor assembly 3 and parallel with annular shoulder 13. A rectangular-shaped drive flange, indicated generally at 20, is mounted on rotor hub end 15 and secured thereon against shoulder 16 by circular welds or brazed areas indicated at 21 (FIG. 4). Drive flange 20 is formed with out-turned stiffening marginal flanges 22.

A pair of pins 25 is mounted on drive flange 20 and extends outwardly therefrom in a cantilever-type manner. Pins 25 (FIG. 8) each include a cylindrical shank 26 terminating at one end in a circular head 27 and on the other end in a reduced tubular projection 29. Pin head 27 has a flat side 28. Pins 25 extend through holes 30 which are formed in drive flange 20 and are complementary in diameter to shanks 26 (FIG. 4). Flat sides 28 of pins 25 extend parallel with the associated top and bottom reinforcing flange 22 to provide clearance for the pin heads and to prevent any possible rotation of the pins with respect to drive flange 20.

A pair of arcuate-shaped clutch shoes, indicated generally at 32 (FIGS. 1 and 2), are pivotally mounted on drive flange 20 by pins 25 and are arranged in an end-to-end relationship with respect to each other. Each clutch shoe 32 includes a web 33 formed by a pair of web plates 33a and 33b (FIGS. 4 and 5), to provide a laminated shoe web construction. An arcuate shoe table 34 is staked to the outer periphery of each shoe web 33 and has a strip of friction material 35 bonded thereto by an adhesive or other means (FIG. 5). Each shoe web 33 is formed with a generally circular cut-out portion 36 at one end for pivotally mounting the clutch shoes on pins 25. A hole 37 is formed at the opposite end of each shoe web for receiving a spring pin 38 therein. A second spring pin hole 39 also is formed in the shoe webs adjacent to cutouts 36 for receiving a second spring pin 40. Pins 38 and 40 preferably have a knurled center portion which provides a force fit with the edges of holes 37 and 39.

Clutch shoes 32 are pivotally mounted on pins 25 by bushing assemblies 42, shown particularly in FIGS. 4, 6 and 7. Each bushing assembly 42 includes an outer metal bushing sleeve 43 (FIG. 6) and an inner bushing 48 (FIG. 7). Bushing sleeve 43 has a cylindrical configuration with an annular shoulder 44 separating a main cylindrical body portion 45 and an enlarged cylindrical end collar portion 46. Bushing sleeves 43 are secured within shoe cutout portions 36 by welds or brazed areas 47 (FIG. 4) with shoulders 44 abutting shoe webs 33. Bushings 48 are telescopically mounted by a force fit within cylindrical bores 49 of sleeves 43.

Bushings 48 are formed by spaced inner and outer concentric metal sleeves 50 and 51, respectively, with the intervening annular space 54 being filled with an annulus 52 of an elastomer material formed of chloroprene such as neoprene. Elastomer annulus 52 is bonded to inner and outer sleeves 50 and 51. Bushings 48 are telescopically mounted on shanks 26 of pins 25 with force fit connections being provided between shanks 26 and bores 53 of inner sleeves 50. A retaining washer 55 is mounted on the outer end of each pin 25 and is clamped into abutting relationship with the outer end of inner bushing sleeve 50 upon tubular projection 29 of pin 25 being staked against washer 55. Inner sleeve 50 is longer than outer sleeve 51 (FIG. 4), whereby the ends of inner sleeve 50 abut washer 55 and drive flange 20 to space outer sleeve 51 and elastomer annulus 52 from washer 55 and flange 20, as shown in FIG. 4. Bushing sleeve 44 is equal in length to outer sleeve 50 and annulus 52 so as to be spaced from washer 55 and flange 20.

Bushing assemblies 42, in combination with cantilever pins 25, provide the pivotal mounting for the clutch shoes 32, which when acted upon by sufficient centrifugal force, pivot outwardly into driving engagement with housing wall surface 7 without becoming disengaged from pins 25 as in the construction of U.S. Pat. No. 2,087,968.

A pair of extension springs 56 extends between each pair of spring pins 38 and 40 to bias the swinging ends of clutch shoes 32 toward retracted position. Each spring 56 has a pair of hook-shaped ends 57 which are engaged in grooves 58 formed in the ends of pins 38 and 40.

A modified bushing configuration, indicated at 60 (FIG. 5), is shown in FIG. 14 mounted on one of the cantilever pins 25. Bushing 60 is formed of a high-strength plastic material and has a smooth cylindrical outer surface 61 and a central bore 62. Bushing 60 is telescopically mounted within bore 49 of bushing sleeve 43 in such a manner to permit sleeve 43 to rotate or pivot on bushing 60 without any radial movement or wobble therebetween.

Pin shank 26 extends through bushing bore 62 and may be bonded thereto by an adhesive. Annular flat end faces 63 and 64 of plastic bushing 60 are clamped between retaining washer 55 and drive flange 20, respectively, upon staking of pin end 29 against washer 55.

The operation of improved clutch assembly 1 is described below and is shown in retracted position in FIG. 1 and in extended engaged position in FIG. 2.

Clutch shoes 32 are held in retracted position by springs 56 with shoe web projections 67 engaging hub end portion 15. Clutch projections 67 are shown and described in detail in Application Ser. No. 918,783, filed June 26, 1978 which is assigned to the same Assignee as the present invention.

The retracted or unactuated clutch position shown in FIG. 1 occurs when shaft 2 is at rest or at a relatively low speed which is below a predetermined engagement speed. This inward retracted position of clutch shoes 32 provides a small gap or spacing 68 between shoe friction material 35 and inner surface 7 of drum housing 4, enabling rotor assembly 3 to rotate freely without affecting stationary clutch housing 4.

Shoes 32 attempt to move radially outwardly from their retracted position of FIG. 1 under the influence of centrifugal force as the rotational speed of shaft 2 increases. The predetermined resistance of springs 56 retains the shoes in disengaged position until shaft 2 reaches the predetermined engagement speed. Upon reaching this engagement speed, clutch shoes 32 move outwardly until friction material strips 35 drivingly engage drum wall 7, as shown in FIG. 2. This coupling engagement rotates housing 4 together with rotor assembly 3 to operatively drive a pulley V-belt (not shown) extending about and seated within the pulley V-grooves. The engagement speed of the clutch is dependent upon a number of known and determinable factors such as the weight of clutch shoes 32, the load rate of springs 56, location of pins 25, etc.

Clutch shoes 32 will maintain their driving engagement with driven clutch member 4 until the speed of shaft 2 decreases to a predetermined level, whereupon the centrifugal force exerted on the shoes is overcome by the biasing force of springs 56. At the disengagement speed, springs 56 will retract the shoes from the position of FIG. 2 to that of FIG. 1.

The above-described centrifugal clutch operation is typical for various types of centrifugal clutch constructions using pivotally mounted shoes with spring retainers.

Figure 12:
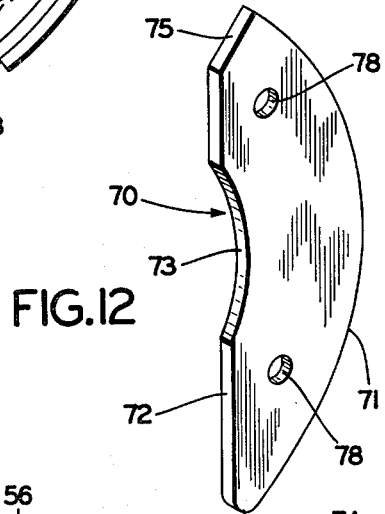
FIG. 12 is a perspective view of one of the weight plates adapted to be mounted on the clutch shoes as shown in FIG. 11.
Figure 11:
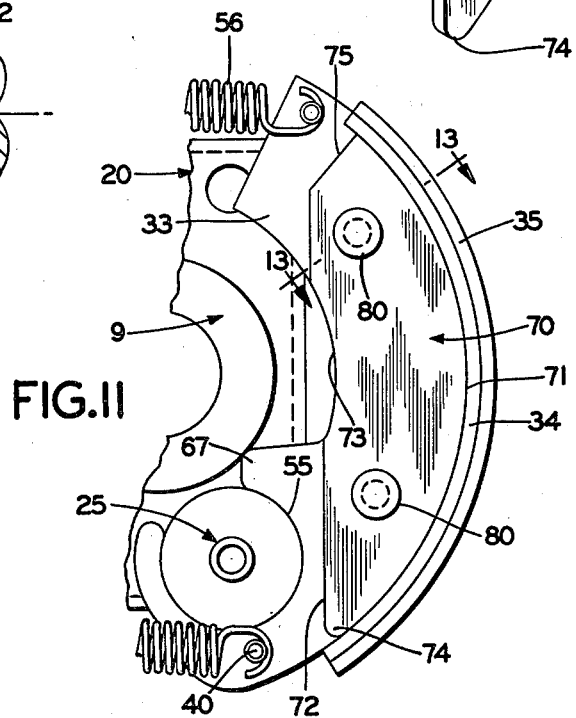
FIG. 11 is a fragmentary view of a portion of the rotor assembly and of the right hand clutch shoe of FIG. 1 having weight plates mounted thereon.
Figure 13:
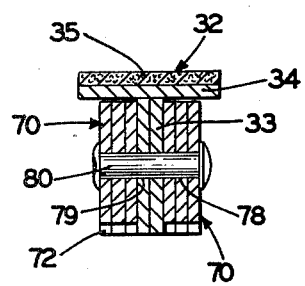
FIG. 13 is a fragmentary sectional view taken on line 13—13, FIG. 11.

It is desirable in many clutch applications to provide means for varying the engagement and disengagement speeds of the clutch shoes in order to achieve various operating characteristics with the same basic clutch construction. In accordance with the invention, a relatively simple and inexpensive arrangement for achieving this result is shown in FIGS. 11, 12 and 13. A plurality of weight plates, indicated generally at 70 (FIG. 12), are removably centrally mounted on each clutch shoe 32 to change the weight of the shoe, thereby achieving different operating characteristics without appreciably changing the center of gravity of the shoe.

Weight plate 70 has a generally arcuate configuration with a curved outer end surface 71 and a chord-like inner edge 72 formed with a central concave recess 73. Edge 72 is connected to outer curved edge 71 by a curved corner 74 at one end and a straight edge segment 75 at the opposite end. The particular configuration of weight plate 70, and in particular outer curved edge 71, is complementary to the outer curved edge of shoe web 33, with the curvature of concave recess 73 matching the curvature of the inner edge of shoe web 33.

A pair of holes 78 is formed in weight plate 70 and is adapted to align with a pair of complementary holes 79 formed in shoe webs 33. Rivets 80 (FIG. 13) or other fastening means mount one or more weight plates 70 on each clutch shoe 32. Various numbers of weight plates 70 may be mounted on the clutch shoes, six of which are shown in FIG. 13. Three weight plates 70 preferably are mounted on each side of the clutch shoe web to provide a balanced configuration therefor. Regardless of the number of plates 70 that are mounted on each shoe, the shoe's center of gravity will be relatively unchanged. This advantage is not believed possible with known clutch constructions.

Improved centrifugal clutch construction 1 has a number of advantageous features. The cantilever mounting of clutch shoes 32 on pins 25 eliminates the various extra components heretofore required for mounting of the clutch shoes on a simple beam-type arrangement wherein the clutch shoe pivot pin was supported on both ends. The prior simple beam-type mounting of the clutch shoes increases both the cost and weight of the clutch, and more importantly, increases the axial width of the clutch preventing use of the clutch in certain installations having limited space requirements without sacrificing the operating characteristics and strength of the clutch. Another important advantage of the improved clutch is bushing assembly 43. Bushing assembly 43, together with pin 25, provides the pivot means for each of the clutch shoes. Pivotal movement of the clutch shoes between retracted and extended positions is achieved by the flexing of the annulus of elastomer material 52. Elastomer 52 in addition to providing the pivotal motion needed for the clutch shoes, also provides a shock-absorbing effect for the forces encountered by the clutch shoes which heretofore was transmitted directly to the mounting pins upon engagement of the clutch shoes with the pulley clutch housing. The amount of twisting or flexing of elastomer annulus 52 is relatively slight due to the relatively small space that clutch shoe friction material 35 moves during engagement and disengagement with the clutch housing. Assembly 43 also prevents the clutch shoes from experiencing possible repeated shocks and stresses upon moving away from and returning to their respective pivot pins as could occur in prior clutch constructions in which the clutch shoes are not captured at their pivot connections.

Plastic bushings 60, when used in place of bushings 48, provide a lightweight, inexpensive and rugged component for pivotally mounting the clutch shoes on cantilever pins 25. The clutch shoes 32, which are fixed to bushing sleeves 43, will rotate on the outer surface of bushings 60 which are fixed on pin shanks 26, which provides a relatively large rotational sliding surface area over which the sliding forces are distributed.

A very important feature of improved clutch construction 1 is the relative ease of changing the operating characteristics of the clutch by mounting and removing a plurality of weight plates 70 on and from the clutch shoes. This enables the same basic clutch construction to be used for various operating conditions requiring only the addition or subtraction of inexpensive weight plates. Weight plates 70, when mounted on the clutch shoe webs 33, as can be seen in FIGS. 11 and 13, do not increase the overall size or dimension of the clutch and are contained conveniently and simply within the confines or outline of the clutch shoes.

Weight plates 70 are mounted symmetrically with respect to the clutch shoes, thereby maintaining the same center of gravity of the shoe as its original center of gravity prior to adding the plates thereon. This undesirable shifting of the shoes' center of gravity will occur in other constructions wherein weights are added at the ends of the clutch shoes. This central symmetrical mounting of the weight plates will enable the clutch shoes to maintain their previously determined and calculated operating characteristics, except for those characteristics which will be changed by the addition of the weights. This central mounting of plates 70 also reduces undesirable stresses on the clutch shoe webs 33 and shoe tables 34 which could occur with unbalanced weight placement. The double attachment points of the weight plates to the shoe webs by a pair of rivets 80 prevents any movement from occurring between the weights and clutch shoes. Likewise, a relatively large amount of weight can be added to the shoe without affecting its configuration and without adding components that project beyond the confines of the clutch shoes which are subject to breakage and could affect clutch operation.

Accordingly, the improved centrifugal clutch construction provides a construction which is simplified, effective, safe, inexpensive and efficient, which achieves all of the enumerated objectives, provides for eliminating difficulties encountered with prior clutch constructions and devices, and which solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved centrifugal clutch construction is constructed, assembled and operated, the characteristics of the new construction, and the advantageous, new and useful results obtained; the new and useful structures, devices, elements, arrangements, parts, and combinations are set forth in the appended claims.

I claim:

1. An improved centrifugal clutch construction adapted to be mounted on a drive shaft, said clutch construction including:
   (a) a driven clutch member;
   (b) a cylindrical hub having an outer annular shoulder and an internal bore for telescopically receiving the drive shaft therein for rotation of the hub with the drive shaft;
   (c) bearing means telescopically mounted on the hub and in abutting engagement with the annular shoulder for rotatably mounting the driven clutch member thereon;
   (d) drive flange means mounted in a fixed position on the hub in abutting relationship with the annular shoulder opposite of the bearing means for rotation with the hub;
   (e) a pair of pin means mounted on the drive flange means diametrically opposite of each other and extending in an axial direction from the flange means in a cantilever manner;
   (f) a pair of arcuate-shaped clutch shoes each having first and second ends pivotally mounted on the drive flange means in end-to-end relationship with respect to each other and movable outwardly towards and against the driven clutch member under the influence of centrifugal force from retracted to extended position, said clutch shoes each having a shoe web and an outer shoe table;
   (g) the clutch shoes each having a frictional coupling surface provided on the shoe table and adapted to drivingly engage the driven clutch member when the clutch shoes are in extended position;
   (h) spring means operatively engageable with the second ends of the clutch shoes biasing said clutch shoes toward retracted position;
   (i) a pair of bushing means pivotally mounting the clutch shoes on the pin means, each of said bushing means including telescopically mounted inner and outer tubular members, said outer tubular member being securely mounted on a respective clutch shoe first end with said inner member being telescopically mounted on the pin means, and the clutch shoe pivotal movement occurring between said inner and outer tubular members; and
   (j) a plurality of individual weight plates removably mounted on each of the clutch shoe webs.

2. The clutch construction defined in claim 1 in which the inner tubular members are formed of a high strength plastic material with central bores; and in which each of the pin means includes a shank which is telescopically mounted within the bore of a respective inner tubular member; and in which adhesive means bonds the inner tubular members to the pin means shanks.

3. The clutch construction defined in claim 1 in which each of the inner tubular members includes a pair of spaced inner and outer concentric metal sleeves; in which an elastomer material generally fills the space between said inner and outer sleeves and is bonded to said sleeves; in which the pin means is telescopically mounted within the inner sleeve; and in which the inner sleeve is greater in axial length than the outer sleeve.

4. The clutch construction defined in claim 1 in which the drive flange means includes a rectangular-shaped metal plate having reinforcing edge flanges; in which a pair of holes is formed in the drive flange means plate; and in which the cantilever pin means are mounted in and extend through said drive flange means plate holes.

5. The clutch construction defined in claim 1 in which a retaining washer is mounted on each of the pin means; in which each of the pin means includes a pin having a shank which terminates at one end in a head which abuts the drive flange means and at the other end in a staked outturned flange which abuts the retaining washer.

* * * * *